(12) United States Patent
Remoli

(10) Patent No.: US 11,236,876 B2
(45) Date of Patent: Feb. 1, 2022

(54) ILLUMINATION UNIT

(71) Applicant: Massimo Remoli, Montefalcone Appennino (IT)

(72) Inventor: Massimo Remoli, Montefalcone Appennino (IT)

(\*) Notice: Subject to any disclaimer, the term of this patent is extended or adjusted under 35 U.S.C. 154(b) by 0 days.

(21) Appl. No.: 17/121,800

(22) Filed: Dec. 15, 2020

(65) Prior Publication Data

US 2021/0239285 A1    Aug. 5, 2021

(30) Foreign Application Priority Data

Jan. 31, 2020 (IT) .......................... 102020000001924

(51) Int. Cl.
| | | |
|---|---|---|
| *F21S 9/03* | (2006.01) | |
| *F21V 29/50* | (2015.01) | |
| *F21S 8/04* | (2006.01) | |
| *F21Y 105/10* | (2016.01) | |
| *F21Y 115/10* | (2016.01) | |
| *F21W 131/10* | (2006.01) | |

(52) U.S. Cl.
CPC .................. *F21S 9/035* (2013.01); *F21S 8/04* (2013.01); *F21V 29/50* (2015.01); *F21W 2131/10* (2013.01); *F21Y 2105/10* (2016.08); *F21Y 2115/10* (2016.08)

(58) Field of Classification Search
None
See application file for complete search history.

(56) References Cited

U.S. PATENT DOCUMENTS

| | | | |
|---|---|---|---|
| 6,942,361 B1\* | 9/2005 | Kishimura | .............. F21S 8/086 362/240 |
| 7,980,725 B2 | 7/2011 | Yu et al. | |
| 9,273,840 B1\* | 3/2016 | Braun | .................... H05B 47/10 |
| 2007/0247842 A1 | 10/2007 | Zampini et al. | |
| 2011/0252678 A1 | 10/2011 | Jones et al. | |

FOREIGN PATENT DOCUMENTS

EP    1431653    6/2004

OTHER PUBLICATIONS

Rapporto di Ricerca e Opinione Scritta [Search Report and Written Opinion] dated Sep. 21, 2020 From the Ministerio Dello Sviluppo , Economico, Direzione Generale Sviluppo Produttivo e Competitivita, Ufficio Italiano Brevetti e Marchi Re. Application No. IT 202000001924. (8 Pages).

\* cited by examiner

*Primary Examiner* — Elmito Breval

(57) ABSTRACT

Disclosed herein is an illumination unit and the method of operation thereof, characterized in that it comprises:
  a photovoltaic module (A),
  a ceiling light fixture (B),
  a supporting structure (A1),
  a shaped line (B1),
  two side wings (B2),
  a certain number of spaces (C),
  optical elements/means (C1),
  a control unit (D),
  an electric storage unit (E),
  a separate printed circuit (F),
  a string (F1),
  a cooling fan (G).

13 Claims, 3 Drawing Sheets

ILLUMINATION UNIT

RELATED APPLICATIONS

This application claims the benefit of priority of Italian Patent Application No. 102020000001924 filed on Jan. 31, 2020, the contents of which are incorporated herein by reference in their entirety.

FIELD AND BACKGROUND OF THE INVENTION

The present invention relates to an illumination unit which can be used for illuminating billboards, indicator and locality signs and road signs in urban and extraurban areas.

In particular, the present invention concerns the field of those processes/phenomena consisting of the emission of light photons by a unit subjected to a given incident electromagnetic radiation, through the use of Fresnel lenses providing better diffusion and homogeneity of the illuminating beam and an electronic control circuit.

Illumination units for road use are known which utilize light sources comprising stratified panels.

Said stratified panels have at least one layer consisting of reflecting pigments that can be activated by direct irradiation by means of an electric lamp.

Normally, power is supplied to said electric lamp at predefined time intervals, so as to activate the pigments according to an alternate cycle.

In this manner, said panels are capable of emitting light with gradually decreasing intensity between one activation cycle of the electric lamp and the next.

Typically, said illumination unit is used/employed in emergency situations, i.e. when a fault occurs in the main illumination unit, in order to replace the latter.

However, the light intensity of said traditional illumination units according to the state of the art is not particularly high, and they may cause several problems in terms of poorly flexible conditions/solutions, ineffectiveness and unreliability, such as:

they are only used/employed in cases of emergency in order to replace the main illumination units, because of their limited light emission power;

in order to activate the light storage layer, they require irradiation, though only intermittently, by an electric light source, which in turn requires power;

excavation works need to be carried out for laying the cables connecting the various illumination units;

in the event of a black-out of a single illumination unit, the whole set of units will become inactive.

SUMMARY OF THE INVENTION

It is a fist object of the present invention to provide a system which does not suffer from the above-mentioned drawbacks of traditional systems/methods and which is particularly simple, comfortable and efficient.

It is another object of the invention to provide a system with a simple structure that can be manufactured easily at low costs, offers high reliability, is grid-independent, and has a reduced power consumption, resulting in economical and environmental savings including:

reduced costs and high scalability of the system;
reduced installation costs;
reduced grid connection costs;
no emission of climate-changing substances.

The main technical problem that the present invention intends to solve is the possibility of making such a low-consumption illumination unit which can use power in renewable form for a long period of time, produced from solar energy obtained during the day-time hours, without requiring an expensive power supply from an electric grid.

However, the present invention also intends to solve the problems concerning the use of photovoltaic energy storage systems, including:

installation time optimization;
high power-to-weight ratio;
high reliability.

These and other objects are achieved by the present invention through the following features:

obtaining an illumination with constant intensity;
creating an illumination unit which has a customized size based on the format of the indicator or locality sign/board to be illuminated;
creating a storage unit for supplying power during different programmed periods, e.g. in order to store energy (from the photovoltaic panel) during the day-time hours and/or in the summer periods and then supply it (to the loads to be powered) during the night-time hours and/or in the winter periods.

In particular, the device according to the present invention is a single assembly composed of a modular metal structure comprising a photovoltaic panel with an integrated electric energy storage unit, preferably a lithium-iron battery connected to a control element intermittently powered and driven by a regulator device for turning it on/off.

A person skilled in the art will understand that the subject of the invention is susceptible of numerous modifications and variations, all falling within the inventive concept set out in the appended claims. All details may be replaced with other technically equivalent elements, and the materials may differ according to specific requirements, without however departing from the protection scope of the present invention.

No device has been either specified or suggested for performing the above-described activities/functions which is equal or similar to the one disclosed in the present invention.

In particular, said modular structure is made of aluminum, whose principal organoleptic characteristic is that it is a good heat conductor (dissipates thermal energy), which is useful for lowering the temperature reached by the electric devices when in use.

According to a further advantageous aspect of the present invention, said modular structure consists of two side wings, i.e. two inwardly deformed/bent ends, which are characterized in that:

they make said structure stiffer and stronger;
they amplify the projected light and avoid any annoying reverberation, thus acting as a luminous barrier and contributing to reducing the optical pollution.

Even though the subject of the present invention will be described herein with particular reference to the annexed drawings, the reference numerals used in the description and in the claims are merely meant to facilitate the understanding of the invention and shall not limit the claimed protection scope.

The present invention will be described below with reference to a currently preferred embodiment thereof, but it is understood that other measures may be taken, other details may be added, and other variations and modifications may be made in the future as technologies evolve, without however departing from the protection scope of the present invention.

Therefore, those skilled in the art will understand that it may be subject to numerous modifications and variations, which will still fall within the protection scope defined by the appended claims, especially in terms of reproduction scale and dimensions, in that subjective/objective requirements will dictate the appropriate dimensional specifications for the intended purpose, which will depend on design variables, with the possibility for the manufacturers of changing shapes for practical commercial needs and of adopting colors, anatomical shapes and/or adequate sizes as required (e.g. customized in accordance with the format of the billboard to be illuminated).

BRIEF DESCRIPTION OF THE SEVERAL VIEWS OF THE DRAWINGS

Likewise, it must be pointed out that further features and advantages of the invention will become more evident in the light of the following detailed description of a preferred embodiment, which will not however exclude other embodiments and which is illustrated merely by way of non-limiting example in the annexed drawings, wherein the device/system according to an embodiment of the present invention is made up of the following parts represented/described in the respective FIGS. 1, 2 and 3, each one showing a schematic view of a low-consumption illumination unit according to the invention.

DESCRIPTION OF SPECIFIC EMBODIMENTS OF THE INVENTION

Figure 1:
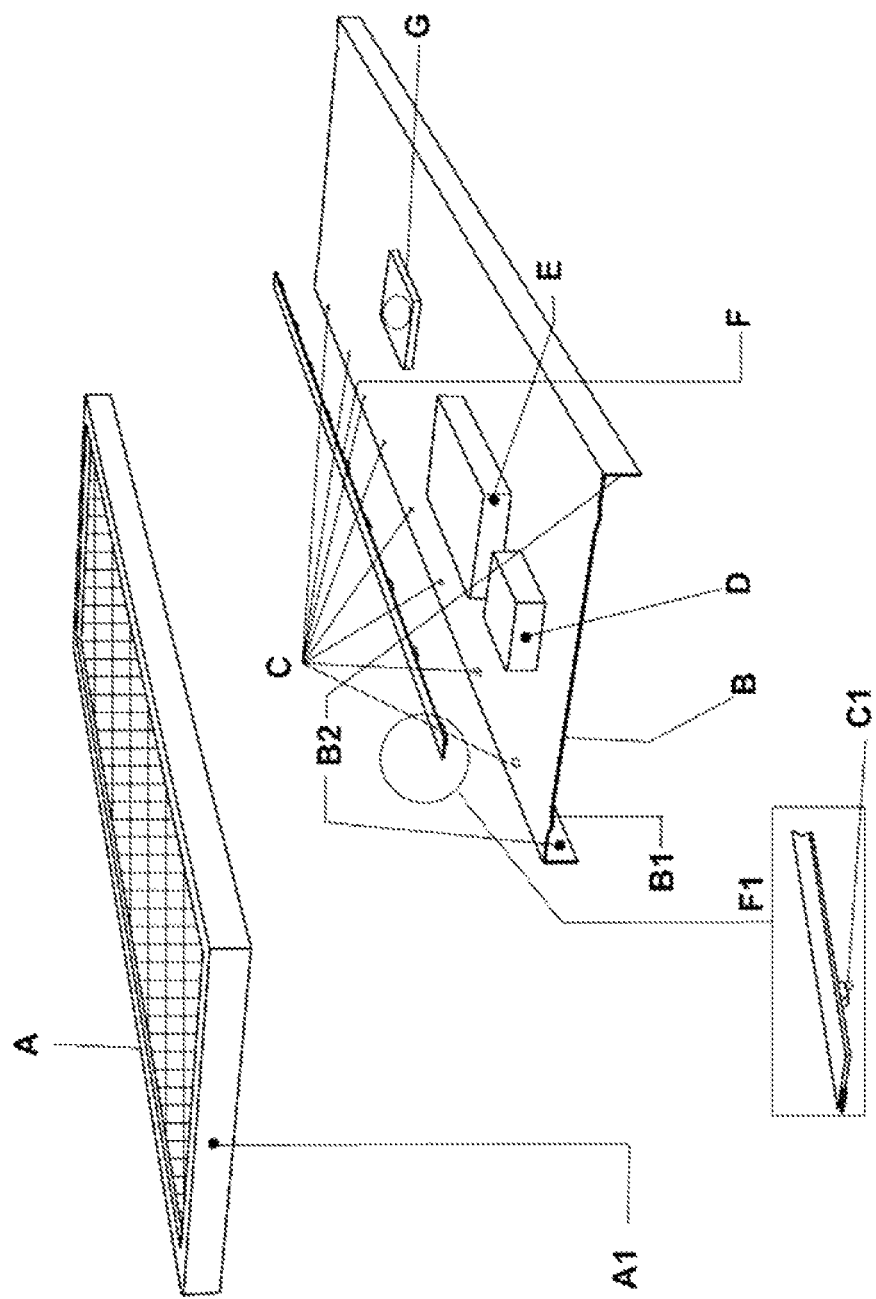
Figure 2:
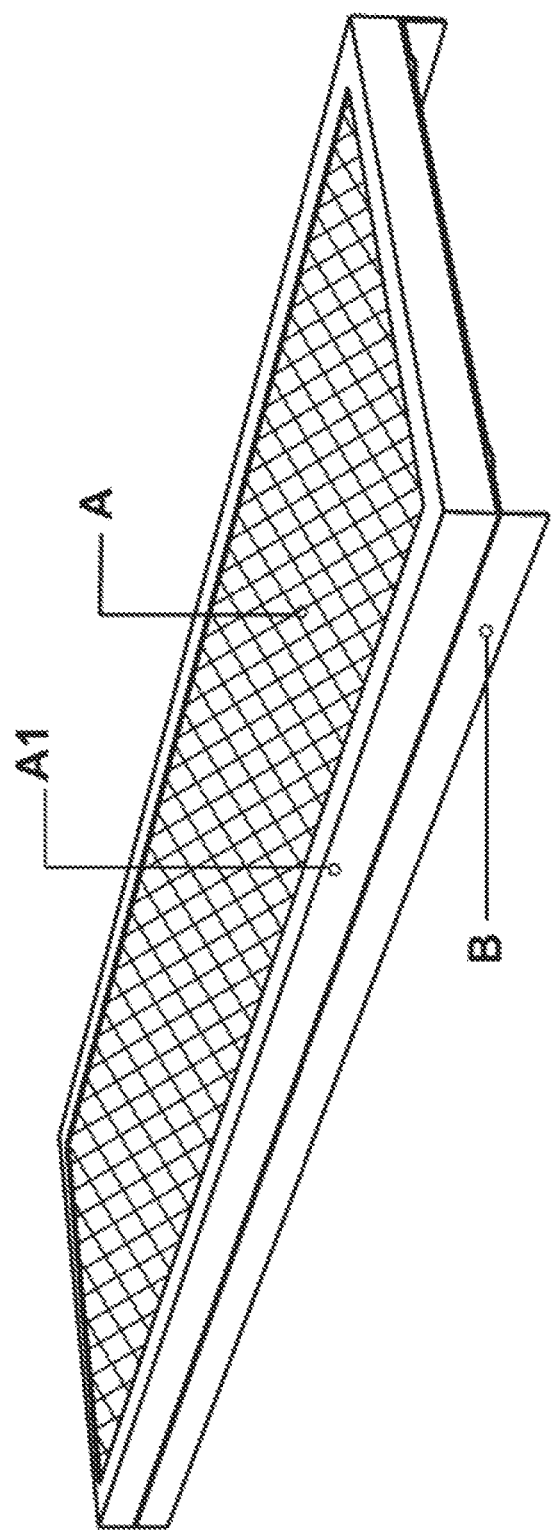
Figure 3:
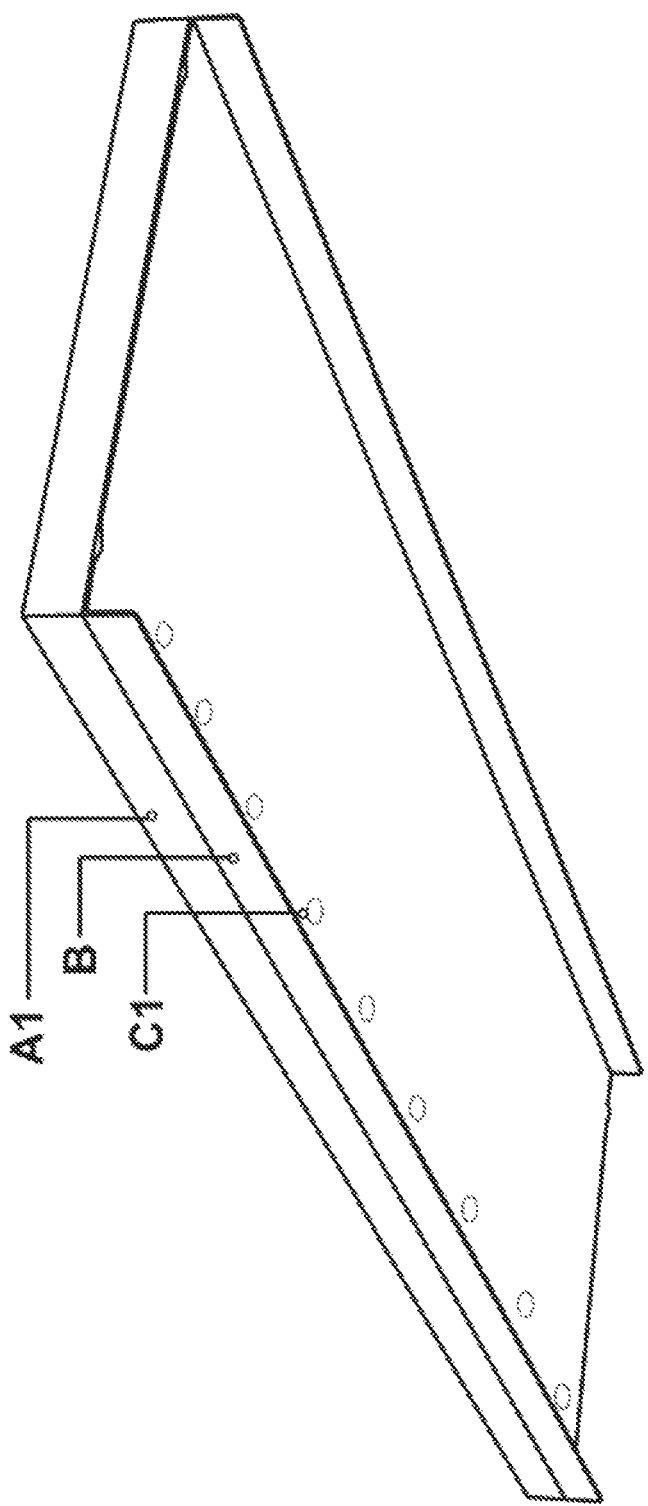

With reference to the annexed drawings, an illumination unit (depicted as a whole in FIGS. 1, 2 and 3) comprises a supporting structure (A1), preferably made of aluminum and adapted for fixing a photovoltaic module (A) composed of a certain number of mutually connected photovoltaic cells encapsulated therein, i.e. an assembly capable of converting solar energy and producing a given power output.

As is known, the photovoltaic technology makes it possible to directly transform the energy associated with solar radiation into electric energy by exploiting the photovoltaic effect (interaction between the luminous radiation and the valence electrons of the material), which is based on the properties of some materials (the most common one being silicon, which is widespread in nature) that, if suitably treated, can generate electricity when hit by a luminous radiation.

Said illumination unit is obtained by mechanical assembly of a ceiling light fixture (B) to said supporting structure (A1) of said photovoltaic module (A) through a junction point.

Said ceiling light fixture (B) is an anodized structure, preferably made of aluminum and composed of two side wings (B2) obtained by bending in proximity to both ends, comprising:
    an electric storage unit (E) inserted/used in a suitable container, i.e. a sealed container preferably made of aluminum;
    a housing seat consisting of a certain number of spaces (C), i.e. apertures, preferably circular in shape, in particular holes adapted to contain optical elements/means (C1), i.e. light emitting illumination devices (Light Emitting Diodes) with Fresnel lenses (well known to those skilled in the art) and integrated into a separate printed circuit (F) made on a string (F1), preferably of metal, adapted to reduce the wirings necessary for connecting it to said optical elements/means (C1), wherein:
    said optical elements/means (C1) are preferably manufactured/made from REVO-01 polyurethane material, on the surface of which concentrical refractive grooves are carved, i.e. annular (ring-like) sections/surfaces adapted to provide a mechanical connection (by overlapping) with said ceiling light fixture (B) according to an arrangement matching/coinciding with said spaces (C), and wherein:
    said spaces (C) are punched in said ceiling light fixture (B) in proximity to a shaped line (B1) formed on a sheet that is present on just one side of said ceiling light fixture (B), thus allowing the luminous beam to be conveyed (with a homogeneous flux) onto a useful part of the surface to be illuminated, and allowing the construction of a large illuminating beam with a small focal length;
    a control unit (D) adapted to control all the functions of the illuminator, including:
    intermittent activation of the illumination at programmable time intervals (depending on the brightness level of the surrounding environment) by means of a timer device, i.e. a timer connected to said printed circuit (F) and comprising a charge controller, configured and programmed to:
    ensure the maximum luminous intensity during a night-time slot and a lower intensity during a day-time slot;
    ensuring the supply of constant current to the loads, taking it from said photovoltaic panel (A) in conditions of high irradiation (e.g. during the day-time hours, and in particular in the summer periods) and/or from said electric storage unit (E) in conditions of low irradiation (e.g. during the night-time hours, and in particular in the winter periods);
    interrupting the charge (by means of a switch) when said electric storage unit (E) is fully charged, and disconnecting the loads when it is completely discharged, thus avoiding overcharge or deep-discharge conditions and considerably extending its service life;
    ensuring adequate ventilation for said electric storage unit (E) by means of a cooling fan (G) connected to a thermostat;
    checking and verifying the operation of the illumination unit by means of a remote monitoring device.

What is claimed is:
1. An illumination unit, comprising:
    a supporting structure (A1);
    a photovoltaic module (A) mounted to said supporting structure (A1);
    a ceiling light fixture (B) mounted to said supporting structure (A1), at an opposite side of said supporting structure (A1) with respect to said photovoltaic module (A);
wherein:
    said ceiling light fixture (B) comprises a substantially planar wall and two side wings (B2) extending from opposite sides of said planar wall, said ceiling light fixture (B) further comprising:
    an electric storage unit (E) chargeable with electric power generated by said photovoltaic module (A);
    a housing seat comprising a plurality of spaces (C) for containing optical elements/means (C1) and integrated into a separate printed circuit board (F) made on a string (F1), wherein:
    said optical elements/means (C1) are connected with said ceiling light fixture (B) according to an arrangement matching/coinciding with said spaces (C), and wherein:

said spaces (C) are punched in said substantially planar wall in proximity to a shaped line (B1);
wherein said optical elements/means (C1) are power supplied by said photovoltaic module (A) and/or said electric storage unit (E);
said ceiling light fixture (B1) further comprising:
- a control unit (D) including a timer device connected to said printed circuit board (F), said timer device being configured to intermittently activate said optical elements/means (C1) at programmable time intervals, said control unit (D) further comprising a charge controller,
- a cooling fan (G), and
- a remote monitoring device, wherein said planar wall with said supporting structure (A1) and said photovoltaic module (A) forms a casing, said control unit (D), charge controller (E), cooling fan (G) and string (F1) being housed in said casing.

2. The illumination unit according to claim 1, wherein: said spaces (C) are circular in shape.

3. The illumination unit according to claim 1, wherein: said optical elements/means (C1) are manufactured/made from a polyurethane material.

4. The illumination unit according to claim 1, wherein: said optical elements/means (C1) comprise an annular surface.

5. The illumination unit according to claim 1, wherein: said optical elements/means (C1) comprise Fresnel lenses.

6. The illumination unit according to claim 1, wherein: said supporting structure (A1) is made of aluminum.

7. The illumination unit according to claim 1, wherein: said ceiling light fixture (B) is made of aluminum.

8. The illumination unit according to claim 1, wherein: said string (F1) is made of metal.

9. The illumination unit according to claim 1, wherein: said electric storage unit (E) is of the lithium-iron type.

10. The illumination unit according to claim 1, wherein said wings (B2) extend transversely with respect to said substantially planar wall.

11. The illumination unit according to claim 1, wherein said control unit (D) is configured to supply a substantially constant current to said optical elements/means (C1).

12. The illumination unit according to claim 11, wherein said constant current is obtained from said photovoltaic module (A) in condition of relatively high irradiation received by said photovoltaic module (A), and from said electric storage unit (E) in condition of relatively low irradiation received by said photovoltaic module (A).

13. The illumination unit according to claim 1, wherein said charge controller is configured for interrupting a charge of said electric storage unit (E) when said electric storage unit (E) is fully charged.

* * * * *